April 21, 1931.   W. C. DURFEE   1,802,007
DEVICE FOR DETERMINING THE EXACT COLOR OF ARTICLES
Filed Feb. 21, 1928
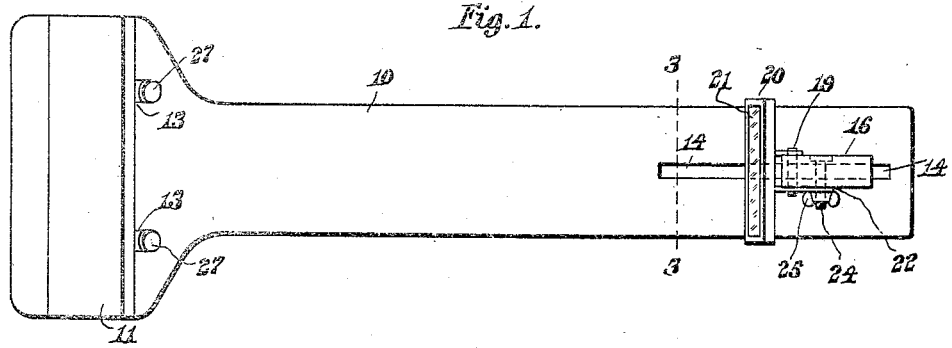
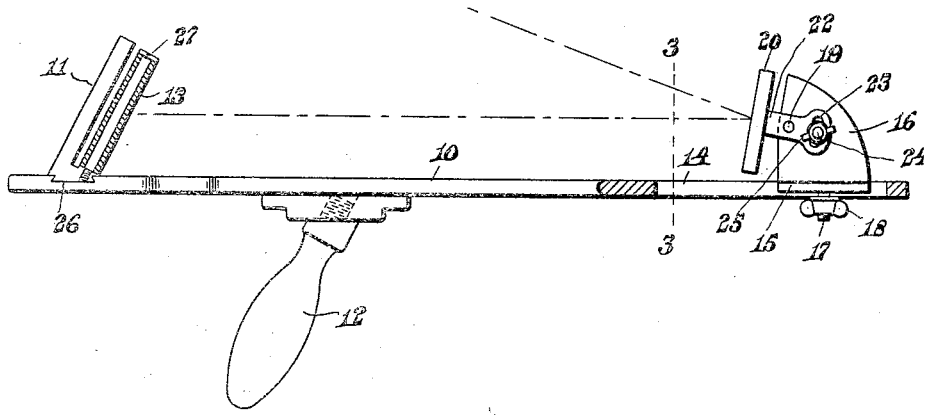
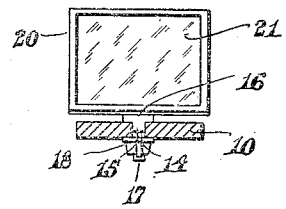
Inventor:
Walter C. Durfee,
by Walter E. Lombard
Atty.

Patented Apr. 21, 1931

1,802,007

UNITED STATES PATENT OFFICE

WALTER C. DURFEE, OF JAMAICA PLAIN, MASSACHUSETTS

DEVICE FOR DETERMINING THE EXACT COLOR OF ARTICLES

Application filed February 21, 1928. Serial No. 255,917.

This invention relates to means for determining the exact color of articles in order that the colors of said articles may be perfectly matched and the object of the invention is the production of a device adapted to support an article adjacent the eyes of the user and having a mirror mounted thereon at a predetermined distance from the article which will reflect the color of said article under the same lighting that the eye receives.

This object is attained by the mechanism illustrated in the accompanying drawing.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claim.

Of the drawings:

Figure 1 represents a plan of a device embodying the principles of the present invention.

Figure 2 represents a side elevation of the same with parts broken away, and

Figure 3 represents a transverse section of same on line 3, 3, on Figs. 1 and 2.

Similar characters indicate like parts throughout the several figures of the drawings.

In the drawings, 10 is a member having at one end a back plate 11 and provided with a downwardly extending handle 12 by which said member may be held with back plate 11 in front of the breast or neck of the user.

This back plate 11 is at an acute angle to said member 10 and parallel therewith and in front of said plate are two revoluble rollers 13 spaced considerably apart and separated from the back plate 11 so that a flat article such as a color chart or sample may be inserted between the rollers 13 and back plate 11.

The member 10 adjacent the back plate 11 is of considerable width so that small objects may be positioned thereon if desired.

The opposite end of member 10 has a slot 14 extending lengthwise thereof and the rib 15 of a block 16 extends into this slot, said rib 15 being movable endwise of said slot 14 to vary the distance between the back plate 11 and said block 16.

A pin 17 extends downwardly from said block 16 through said slot 14 and has threaded thereto a clamp nut 18 by which said block may be clamped in adjusted position.

Pivoted at 19 to the block 16 is a frame 20 in which is mounted a mirror 21 or other reflecting surface facing toward the back plate 11.

An arm 22 secured to frame 20 extends along one side of block 16, this arm 22 having a slot 23 therein through which extends a pin 24 having a clamping nut 25 threaded thereto.

By means of this construction the mirror frame 20 may be adjusted about the pivots 19 and clamped in adjusted position, it being understood that when thus adjusted the frame 20 and mirror 21 therein is at an obtuse angle to the top of member 10.

In other words, the angularity of the mirror 21 to the member 10 is such that when the back plate 11 is held vertically in front of the chest of a person and an article is inserted between said plate and the rollers 13 the reflection of said article from the mirror will be substantially on the level with the eyes of the person using the device.

The device as shown and described may be used to determine the exact color of an article when it is desired to perfectly match said color.

This can be accomplished by putting the colored articles or a color chart on the supporting end of the device and then the article will be subjected to the same lighting that the eye receives and the true color reflected back from mirror 21 to the eyes of the operator will be the exact or true color.

The back plate 11 is dovetailed into the member 10 as indicated at 26 and has secured to the base thereof the pins 27 about which the rollers 13 revolve.

The rollers 13 may be dispensed with if desired, permitting the fixed pins 27 to serve as a guide for the article or chart being placed in front of the back plate 11.

Where the surface of the article is delicate and liable to be defaced by contact with the fixed pins 27 it is preferable to use the rollers 13.

When using the device the back plate 11 is disposed in front of the user's breast with the handle 12 substantially vertical so that the reflection from mirror 21 of any article in front of the back plate 11 will be on the level with the user's eyes.

Consequently what the user of the device sees in the mirror is the actual color of the article under the same lighting that the user's eyes receive.

By moving the frame 20 about its pivot 19 and clamping said frame in adjusted position by the nut 25, the angularity of said frame 20 to the member 10 may be varied to accommodate the device to various conditions.

It is a well known fact that an object which is theoretically white, such as a spoonful of clear crystal salt, in some lights appears gray or shadowed while in stronger lights appears brilliant or brighter than normal white and neither of these colors is the true color of the object.

The only way the normal color of the object may be determined is by subjecting it to the same lighting as the eye receives and this can only be accomplished by the use of a mirror placed at a required distance from the user's eyes.

The device herein shown and described provides a simple but effective means for accomplishing this result.

By experiment it has been found that under most conditions of lighting the human eye adjusts itself so that a standard white placed beside the eye appears white or very nearly so, being neither dark nor brilliant.

It is believed, therefore, that a new discovery has been made in color estimation of great value in providing means whereby a standard color sample may be placed for comparison in a position where it receives practically the same illumination as do the eyes of the user of the device.

This discovery has been extended so that all colors may be compared with a sample color illuminated by a lighting closely like the lighting received by the eye of the observer.

The following example will illustrate how the device is used:

Intending to make a color sketch in crayons, the colors of these crayons were marked on a card which was held in front of the breast so that it faced the light in substantially the same manner as did my eyes, so that these colors and my eyes were illuminated in the same degree and manner.

I then held before me at a distance, a small clear mirror and by means of it compared the colors of natural material objects which I desired to portray in colors (which I could see before me) against the colors of my crayon marks which I could also see by means of the mirror in my hand.

It was found by this trial that these crayon marks so placed were acceptably illuminated for purpose of comparison, appearing neither brighter nor darker than was convenient for my estimation.

By this method extremely close comparisons of color may be made.

Instead of the crayon marks, the colored picture itself may be held in the same position against the breast and the colors thereof in the mirror may be compared with the object which it represents disposed at one side of said mirror.

My device provides a convenient geometrical arrangement of color sample and mirror by which one may see the colored object in close proximity to the color sample and either compare or match the colors.

It will be obvious, therefore, that by means of my device the exact color of an article may be seen in the mirror and compared with objects in the direct vision of the user.

It is believed that the operation and many advantages of the invention will be understood without further description.

Having thus described my invention, I claim

A member having near one end a back plate extending upwardly at an acute angle, means for supporting a sample on the front of said plate, and a plane reflecting surface upon the opposite end of said member at an obtuse angle thereto and facing a point above said back plate.

Signed by me at Boston, Mass., this 13th day of February, 1928.

WALTER C. DURFEE.